(12) United States Patent
Jeon et al.

(10) Patent No.: US 9,317,910 B2
(45) Date of Patent: Apr. 19, 2016

(54) DEFOGGING SYSTEM AND DEFOGGING METHOD

(71) Applicant: HANWHA TECHWIN CO.,LTD., Changwon-si (KR)

(72) Inventors: Seong Ha Jeon, Changwon-si (KR); Young Je Jung, Changwon-si (KR)

(73) Assignee: Hanwha Techwin Co., Ltd., Changwon-si (KR)

(*) Notice: Subject to any disclaimer, the term of this patent is extended or adjusted under 35 U.S.C. 154(b) by 0 days.

(21) Appl. No.: 14/479,746

(22) Filed: Sep. 8, 2014

(65) Prior Publication Data

US 2015/0279011 A1 Oct. 1, 2015

(30) Foreign Application Priority Data

Mar. 27, 2014 (KR) .................. 10-2014-0036126

(51) Int. Cl.
  *G06K 9/40* (2006.01)
  *G06T 5/00* (2006.01)
  *G06T 5/40* (2006.01)

(52) U.S. Cl.
  CPC ................ *G06T 5/009* (2013.01); *G06T 5/005* (2013.01); *G06T 5/40* (2013.01); *G06T 2207/20208* (2013.01); *G06T 2207/30232* (2013.01)

(58) Field of Classification Search
  None
  See application file for complete search history.

(56) References Cited

U.S. PATENT DOCUMENTS

2008/0316349 A1* 12/2008 Toyoda .................. 348/333.01
2010/0040300 A1    2/2010 Kang et al.

FOREIGN PATENT DOCUMENTS

| JP | 2011-3048 A | 1/2011 |
| KR | 10-2010-0021952 A | 2/2010 |
| KR | 10-2011-0077596 A | 7/2011 |
| KR | 10-1292421 B1 | 8/2013 |

* cited by examiner

*Primary Examiner* — Andrew Moyer
(74) *Attorney, Agent, or Firm* — Sughrue Mion, PLLC

(57) ABSTRACT

Provided are a defogging system and a defogging method. The defogging system includes: an illuminance sensor configured to detect a surrounding illuminance; a level determiner configured to determine a defogging level of the input image based on the detected surrounding illuminance; and a defogger configured to determine a fog state of the input image based on a histogram of the input image, and adaptively defog the input image according to the determined fog state and defogging level.

18 Claims, 6 Drawing Sheets

FIG. 5

| Histogram | Y data[11:0] | Histogram | Y data[11:0] | Histogram | Y data[11:0] | Histogram | Y data[11:0] |
|---|---|---|---|---|---|---|---|
| HIST[0] | 0=<Y<2 | HIST[16] | 24=<Y<27 | HIST[32] | 182=<Y<207 | HIST[48] | 1449=<Y<1650 |
| HIST[1] | Y=2 | HIST[17] | 27=<Y<30 | HIST[33] | 207=<Y<236 | HIST[49] | 1650=<Y<1879 |
| HIST[2] | Y=3 | HIST[18] | 30=<Y<34 | HIST[34] | 236=<Y<268 | HIST[50] | 1879=<Y<2139 |
| HIST[3] | Y=4 | HIST[19] | 34=<Y<39 | HIST[35] | 268=<Y<305 | HIST[51] | 2139=<Y<2436 |
| HIST[4] | Y=5 | HIST[20] | 39=<Y<44 | HIST[36] | 305=<Y<348 | HIST[52] | 2436=<Y<2774 |
| HIST[5] | Y=6 | HIST[21] | 44=<Y<50 | HIST[37] | 348=<Y<396 | HIST[53] | 2774=<Y<3159 |
| HIST[6] | Y=7 | HIST[22] | 50=<Y<57 | HIST[38] | 396=<Y<451 | HIST[54] | 3159=<Y<3597 |
| HIST[7] | Y=8 | HIST[23] | 57=<Y<65 | HIST[39] | 451=<Y<513 | HIST[55] | 3597=<Y |
| HIST[8] | Y=9 | HIST[24] | 65=<Y<74 | HIST[40] | 513=<Y<584 | | |
| HIST[9] | Y=10 | HIST[25] | 74=<Y<84 | HIST[41] | 584=<Y<665 | | |
| HIST[10] | 11=<Y<13 | HIST[26] | 84=<Y<96 | HIST[42] | 665=<Y<757 | | |
| HIST[11] | Y=13 | HIST[27] | 96=<Y<109 | HIST[43] | 757=<Y<862 | | |
| HIST[12] | 14=<Y<16 | HIST[28] | 109=<Y<124 | HIST[44] | 862=<Y<981 | | |
| HIST[13] | 16=<Y<18 | HIST[29] | 124=<Y<141 | HIST[45] | 981=<Y<1117 | | |
| HIST[14] | 18=<Y<21 | HIST[30] | 141=<Y<160 | HIST[46] | 1117=<Y<1272 | | |
| HIST[15] | 21=<Y<24 | HIST[31] | 160=<Y<182 | HIST[47] | 1272=<Y<1449 | | |

DEFOGGING SYSTEM AND DEFOGGING METHOD

CROSS-REFERENCE TO RELATED APPLICATION

This application claims priority from Korean Patent Application No. 10-2014-0036126, filed on Mar. 27, 2014, in the Korean Intellectual Property Office, the disclosure of which is incorporated herein in its entirety by reference.

BACKGROUND

1. Field

Apparatuses and methods consistent with exemplary embodiments of the inventive concept relate to a defogging system and a defogging method.

2. Description of the Related Art

Since a closed-circuit television (CCTV) has to monitor outdoor areas 24 hours, a method of improving a quality of an image is used based on a defogging function when fog or the like occurs.

Most CCTV cameras having a defogging function are manually controlled. In other words, there is no defogging function to automatically check a current degree of fog, or even if such a defogging function exists, the defogging function is not accurate. Thus, the quality of an image may deteriorate as the defogging function is performed at a dark night time or even when no fog occurs.

SUMMARY

One or more exemplary embodiments of the inventive concept provide a defogging system and a defogging method, whereby image fog is adaptively removed based on a current fog state and illuminance.

Various aspects will be set forth in part in the description which follows and, in part, will be apparent from the description, or may be learned by practice of the presented embodiments.

According to an aspect of an exemplary embodiment, there is provided a defogging system which may include: an illuminance sensor configured to detect a surrounding illuminance; a level determiner configured to determine a defogging level of the input image based on the detected surrounding illuminance; and a defogger configured to determine a fog state of the input image based on a histogram of the input image, and adaptively defog the input image according to the determined defogging level and fog state.

The level determiner may output a maximum defogging level signal if an amplification value of an illuminance detection signal of the illuminance sensor is smaller than a first threshold value, output a minimum defogging level signal if the amplification value is higher than a second threshold value, and output a corresponding defogging level signal if the amplification value is between the first and second threshold values.

The level determiner may decrease the defogging level as the amplification value changes from the first threshold value to the second threshold value.

The defogger may include: a histogram generator that generates the histogram of the input image; a fog detector that detects a first minimum brightness value and a first maximum brightness value from the histogram, the first minimum brightness value and the first maximum brightness value corresponding to a pre-set cumulative probability; and a scaling unit that scales the input image by respectively resetting the first minimum brightness value and the first maximum brightness value to a second minimum brightness value and a second maximum brightness value according to the defogging level determined based on the detected surrounding illuminance.

The fog detector may determine a brightness value at which the pre-set cumulative probability of the histogram is a first reference value as the first minimum brightness value, and determine a brightness value at which the pre-set cumulative probability is a second reference value as the first maximum brightness value.

The first reference value may be 5% of the pre-set cumulative probability and the second reference value may be 95% of the pre-set cumulative probability.

As the defogging level decreases, the scaling unit may reduce an adjustment width between the first minimum brightness value and the second minimum brightness value and an adjustment width between the first maximum brightness value and the second maximum brightness value.

The defogging system may further include: an edge detector that detects an edge amount of the input image; and a gamma applier that, if the edge amount of the input image is lower than or equal to a third threshold value, improves a contrast of the input image by applying a gamma curve to the input image that is defogged based on a relationship between pre-set brightness and an edge amount.

According to an aspect of another exemplary embodiment, there is provided a defogging method which may include: detecting a surrounding illuminance by an illuminance sensor; determining a defogging level of the input image based on the detected surrounding illuminance; and determining a fog state of the input image based on a histogram of the input image, and adaptively defogging the input image according to the determined defogging level and fog state.

The determining the defogging level may include: outputting a maximum defogging level signal if an amplification value of an illuminance detection signal of the illuminance sensor is smaller than a first threshold value; outputting a minimum defogging level signal if the amplification value is higher than a second threshold value; and outputting a corresponding defogging level signal if the amplification value is between the first and second threshold values.

The defogging level may be decreased as the amplification value changes from the first threshold value to the second threshold value.

The determining the fog state and the adaptively defogging may include: generating the histogram of the input image; detecting a first minimum brightness value and a first maximum brightness value which correspond to a pre-set cumulative probability from the histogram; and scaling the input image by respectively resetting the first minimum brightness value and the first maximum brightness value to a second minimum brightness value and a second maximum brightness value according to the defogging level determined based on the detected surrounding illuminance.

The detecting the first minimum brightness value and the first maximum brightness value may include determining a brightness value at which the pre-set cumulative probability of the histogram is a first reference value as the first minimum brightness value, and determining a brightness value at which the pre-set cumulative probability is a second reference value as the first maximum brightness value.

The first reference value may be 5% of the pre-set cumulative probability and the second reference value may be 95% of the pre-set cumulative probability.

The scaling the input image may include, as the defogging level decreases, reducing an adjustment width between the first minimum brightness value and the second minimum brightness value and an adjustment width between the first maximum brightness value and the second maximum brightness value.

The defogging method may further include: detecting an edge amount of the input image; and improving a contrast of the input image by applying a gamma curve to the input image that is defogged, if the edge amount of the input image is lower than or equal to a third threshold value, based on a relationship between a pre-set brightness and an edge amount.

BRIEF DESCRIPTION OF THE DRAWINGS

These and/or other aspects will become apparent and more readily appreciated from the following description of the embodiments, taken in conjunction with the accompanying drawings, in which:

FIG. 5 illustrates an example of a histogram of a log scale regarding data of an input image of 12 bits, according to an exemplary embodiment;

DETAILED DESCRIPTION OF THE EXEMPLARY EMBODIMENTS

The following descriptions exemplify only the principles of the inventive concept. Accordingly, one of ordinary skill in the art is able to realize the inventive concept and understand various apparatuses within the inventive concept even if they are not clearly described or illustrated in the present specification. Also, all terms and exemplary embodiments presented herein are fundamentally and clearly intended for understanding of the inventive concept, and the inventive concept is not limited by the exemplary embodiments and conditions described herein. Also, not only the principles, perspectives, and embodiments of the inventive concept, but also all detailed descriptions enumerating certain embodiments should be construed as including structural and functional equivalents. Also, such structural and functional equivalents should be construed as including not only currently known equivalents but also equivalents to be developed in the future, i.e., all components invented to perform the same functions regardless of their structures.

Accordingly, functions of various components illustrated in drawings including functional blocks displayed as processors or in similar concepts of the processors may be provided by using not only exclusive hardware but also hardware having capabilities for executing suitable software. When functions are provided by processors, the functions may be provided by a single exclusive processor, a single shared processor, or a plurality of individual processors, and some of the functions may be shared. Processors, controls, or terms suggested in similar concepts thereof should not be interpreted by exclusively referring to hardware having capabilities for executing software, but should be construed as implicitly and unlimitedly including digital signal processor (DSP) hardware, or read-only memory (ROM), random access memory (RAM), or nonvolatile memory for storing software. Other well-known hardware may be further included.

The objects, features, and merits of the inventive concept will be clarified via following detailed descriptions in relation to accompanying drawings. In the description of the exemplary embodiments, certain detailed explanations of related art are omitted when it is deemed that they may unnecessarily obscure the essence of the inventive concept.

Also, when a region "includes" an element, the region may further include another element instead of excluding the other element, otherwise differently stated.

Hereinafter, one or more exemplary embodiments will be described in detail with reference to accompanying drawings.

Figure 1:
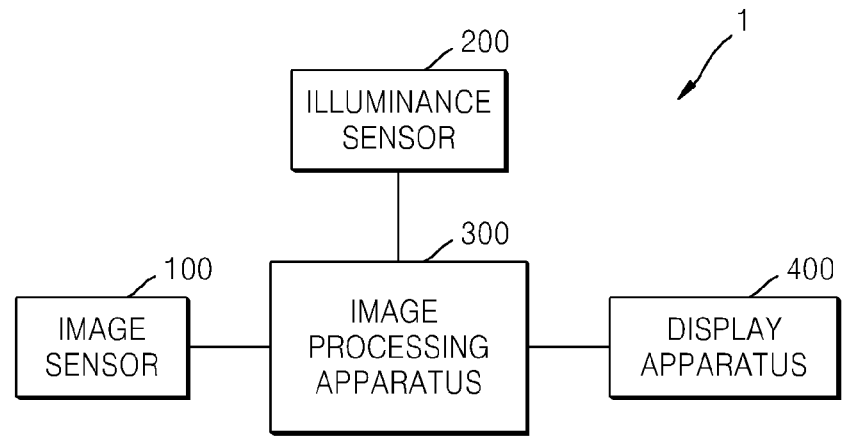
FIG. 1 is a block diagram schematically illustrating a defogging system, according to an exemplary embodiment.

FIG. 1 is a block diagram schematically illustrating a defogging system 1, according to an exemplary embodiment.

Referring to FIG. 1, the defogging system 1 according to the exemplary embodiment may include an image sensor 100, an illuminance sensor 200, an image processing apparatus 300, and a display apparatus 400.

The image sensor 100 may be a camera of any type, such as a pan, tilt, and zoom (PTZ) camera, and is connected to the image processing apparatus 300 wirelessly or via wires. The image sensor 100 may use a photoelectric conversion device, such as a charge coupled device (CCD) or a complementary metal oxide semiconductor (CMOS). The image sensor 100 obtains image information by photographing a front scene. A lens (not shown) for receiving an optical signal may be disposed in front of the image sensor 100.

The illuminance sensor 200 detects an illuminance and an illuminance change in a photographing area. The illuminance sensor 200 amplifies an illuminance detection signal regarding ambient brightness, and outputs the amplified detection signal to the image processing apparatus 300. When it is dark, an amplification value (or a gain) of the illuminance detection signal increases. Thus, a level of the illuminance detection signal of the illuminance sensor 200 and an amplification value are in inverse proportion.

The image processing apparatus 300 detects fog by analyzing brightness distribution of an image signal input from the image sensor 100. The image processing apparatus 300 determines whether to defog the image signal and a defogging degree based on an illuminance detection signal input from the illuminance sensor 200. The image processing apparatus 300 does not perform a defogging algorithm on the input image if the brightness state of surrounding circumstance is a low illuminance. Thus, deterioration of an image quality generated by defogging a low illuminance image may be prevented. Even when the defogging algorithm is performed on the input image, the image processing apparatus 300 may adaptively remove fog by gradually adjusting the defogging degree based on an illuminance change.

The display apparatus 400 processes the image signal output from the image processing apparatus 300 and provides the processed image signal to a user so that the user is able to monitor a displayed image. The display apparatus 400 may include a liquid crystal display (LCD) panel, an organic light-emitting display (OLED) panel, or an electrophoretic display (EPD) panel. The display apparatus 400 may be a touch screen for receiving an input via touch of the user, and thus may operate as a user input interface.

Figure 2:
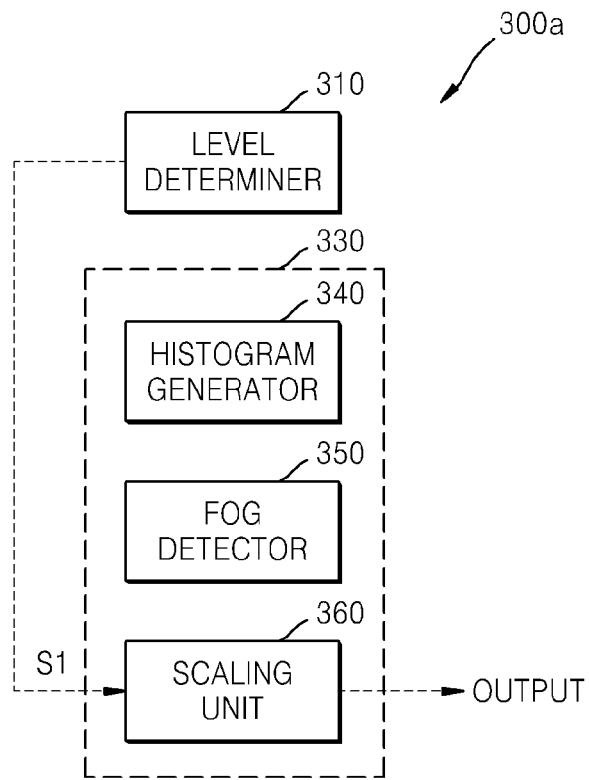
FIG. 2 is a block diagram schematically illustrating a structure of an image processing apparatus, according to an exemplary embodiment.

FIG. 2 is a block diagram schematically illustrating a structure of an image processing apparatus 300*a*, according to an exemplary embodiment. The image processing apparatus 300*a* may be the same as the image processing apparatus illustrated in FIG. 1.

Referring to FIG. 2, the image processing apparatus 300*a* according to the present embodiment may include a level determiner 310 and a defogger 330.

The level determiner 310 may determine a defogging level of an input image based on an amplification value of an illuminance detection signal input from the illuminance sensor 200 of FIG. 1. The level determiner 310 outputs a maximum defogging level signal in response to an illuminance detection signal having an amplification value which is smaller than a first threshold value. The maximum defogging level signal is a control signal for increasing a defogging degree to the maximum. The level determiner 310 outputs a minimum defogging level signal in response to an illuminance detection signal having an amplification value which is greater than a second threshold value. The minimum defogging level signal is a control signal for not removing fog. If the amplification value is between the first and second threshold values, the level determiner 310 outputs a respective defogging level signal.

Figure 4:
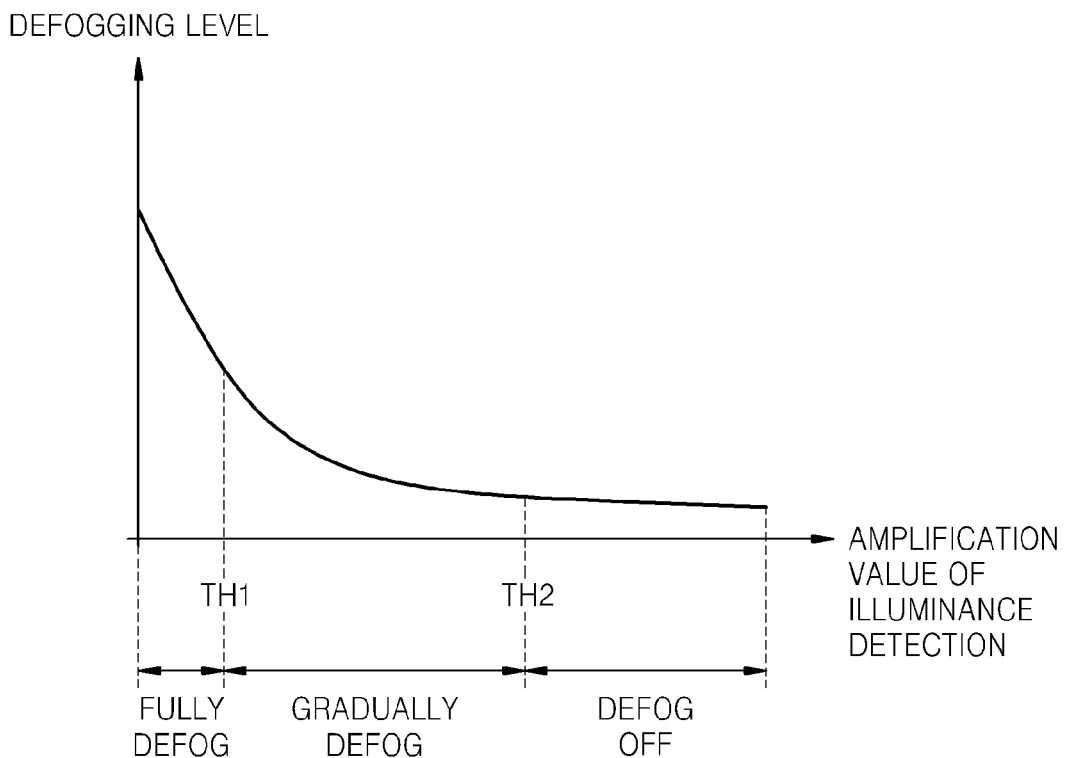
FIG. 4 is a graph showing a relationship between an amplification value of an illuminance detection signal and a defogging level, according to an exemplary embodiment.

FIG. 4 is a graph showing a relationship between an amplification value of an illuminance detection signal and a defogging level, according to an exemplary embodiment. A graph or lookup table of a database of amplification values of predetermined illuminance detection signals and respective defogging levels may be pre-stored.

An x-axis of the graph indicates the amplification value of the illuminance detection signal, and a y-axis indicates the defogging level. If the amplification value of the illuminance detection signal is high, i.e., if an illuminance level is low, the defogging level is low.

The level determiner 310 may set a first threshold value TH1 and a second threshold value TH2 to adaptively perform defogging. For example, the first threshold value TH1 may be a threshold value of illuminance when it is becoming dark, i.e., when illuminance is lower than or equal to 30 lux, and the second threshold value TH2 may be a threshold value of night illuminance when illuminance is lower than or equal to 10 lux.

If the amplification value is lower than the first threshold value TH1, i.e., before it is dark, the level determiner 310 sets a maximum defogging level. The defogger 330 applies a defogging algorithm to an input image to the maximum according to the maximum defogging level.

If the amplification value is higher than the second threshold value TH2, i.e., at night, the level determiner 310 sets a minimum defogging level. The defogger 330 does not apply the defogging algorithm to the input image according to the minimum defogging level.

If the amplification value is between the first and second threshold values TH1 and TH2, the level determiner 310 may determine a defogging level corresponding to the amplification value based on the graph of FIG. 4. The level determiner 310 gradually decreases the defogging level down to the minimum defogging level as the amplification value changes from the first threshold value TH1 to the second threshold value TH2, i.e., as it becomes darker. The defogger 330 gradually decreases a defogging degree on the input image as the defogging level decreases, according to the defogging algorithm.

The defogger 330 may include a histogram generator 340, a fog detector 350, and a scaling unit 360.

The histogram generator 340 generates a histogram of the input image. The histogram shows intensity, i.e., brightness distribution, of the input image, and is a graph in which an x-axis denotes the intensity and a y-axis denotes a frequency indicating the number of pixels in the input image, which correspond to the intensity. In a dark image, the brightness distribution is leaning towards the left in the histogram thereof, and in a bright image, the brightness distribution is leaning towards the right in the histogram thereof.

The histogram generator 340 uses histogram data of a log scale. Since brightness of an image sensor for detecting brightness of a light reacts in a log scale, stages of a histogram of a dark area may be divided minutely and stages of a histogram of a bright area may be divided in large ranges by using the histogram data of the log scale, and thus a fog image may be efficiently analyzed. The histogram generator 340 detects brightness per pixel of the input image and accumulates pixel numbers per brightness, thereby generating the histogram.

FIG. 5 illustrates an example of a histogram of a log scale regarding data of an input image of 12 bits, according to an exemplary embodiment. Herein, a dynamic range for expressing gradation may be determined according to a number of bits in the data, and the dynamic range may be classified as histogram data of a log scale.

For example, an input image of eight (8) bits may have a dynamic range for expressing gradation from 0 to 255, and an input image of 12 bits may have a dynamic range for expressing gradation from 0 to 4096. In FIG. 5, the dynamic range from 0 to 4096 of the input image of 12 bits is classified into 56 areas by using a histogram index 0 HIST[0] to histogram index 55 HIST[55]. Each histogram index represents a brightness value in a certain range, and will now be referred to as a histogram area.

The fog detector 350 may determine if fog has occurred by analyzing the histogram. In the histogram, when brightness distribution is leaning towards the right in overall, a minimum value and a maximum value of brightness is biased to the right, and a difference between the minimum value and the maximum value of the brightness is small, it may be determined brightness of the input image is high due to fog. Accordingly, the fog detector 350 may determine fog occurrence and a degree of fog by determining the minimum value and the maximum value of the brightness from the histogram of the input image.

Figure 6:
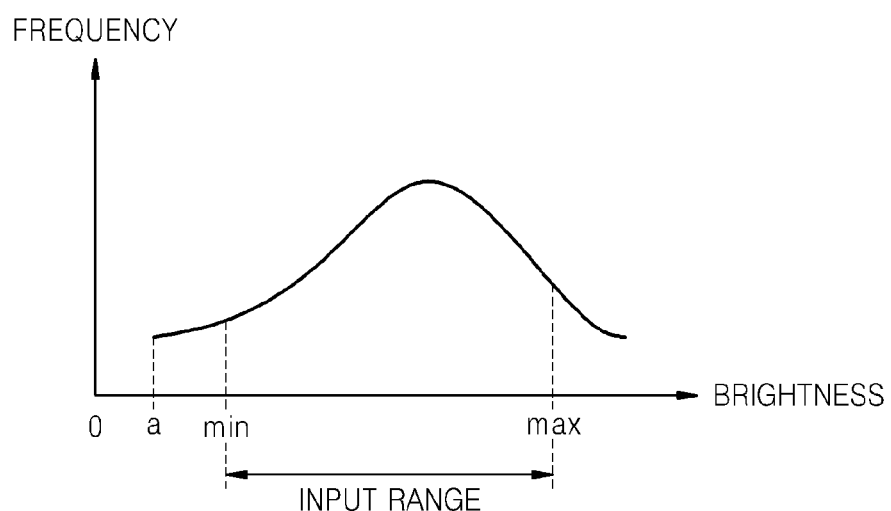
FIG. 6 is a histogram according to an exemplary embodiment.

FIG. 6 is a histogram according to an exemplary embodiment.

Referring to FIG. 6, an x-axis of the histogram indicates brightness represented by the histogram index 55 HIST[55] from the histogram index 0 HIST[0] of FIG. 5, and a y-axis indicates the number of pixels (frequency) corresponding to each histogram index.

The fog detector 350 may detect a center value "a" of a first histogram area where the histogram starts, a center value "min" of a histogram area where a cumulative probability from the first histogram area is a first reference value, and a center value "max" of a histogram area where the cumulative probability from the first histogram area is a second reference value.

The fog detector 350 may determine the center value "min" of the histogram area where the cumulative probability is the first reference value as a first minimum brightness value, and the center value "max" of the histogram area where the cumulative probability is the second reference value as a first maximum brightness value. For example, the first reference value may be 5% (0.05) of the cumulative probability as shown in Equation 1 below, and the second reference value may be 95 (0.95) of the cumulative probability as shown in Equation 2 below.

$$\int_a^{min} f(x)dx \cong 0.05 \quad (1)$$

$$\int_a^{max} f(x)dx \cong 0.95 \quad (2)$$

The scaling unit 360 receives a control signal S1 indicating a defogging level, and scales the input image by adjusting the first minimum brightness value and the first maximum brightness value of the input image, respectively, to a second minimum brightness value and a second maximum brightness value. In other words, the scaling unit 360 scales an input range between the first minimum brightness value and the first maximum brightness value within a dynamic range of reference gradation (hereinafter, referred to as a "reference dynamic range"). The reference dynamic range is a maximum range expressible by an image processing apparatus, and may be determined according to the number of bits of image data. For example, the reference dynamic range may be 0 to 255 in an input image of eight (8) bits and may be 0 to 4096 in an image of 12 bits.

The scaling unit 360 may set the minimum value of the brightness of the input image to a lower value and set the maximum value of the brightness of the input image to a higher value so as to scale the input image, thereby improving contrast by uniformizing entire brightness of the input image. Accordingly, an output image OUTPUT obtained by defogging the input image is output.

Upon receiving the minimum defogging level signal, the scaling unit 360 does not apply the defogging algorithm on the input image. When the input image with a low illuminance is defogged, the input image may become darker and it may be difficult to identify objects therein. Thus, according to an exemplary embodiment, defogging is not performed in the case of an input image with a low illuminance.

Upon receiving the maximum defogging level signal, the scaling unit 360 scales the input image by setting the first minimum brightness value and the first maximum brightness value of the input image to a minimum brightness value and a maximum brightness value of the reference dynamic range. For example, the input image may be scaled by setting the second minimum brightness value to 0 and the second maximum brightness value to 4096.

Equation 3 below is a scaling algorithm for defogging the input image, wherein "Output" denotes a scaled output image and Input denotes an input image.

$$\text{Output}(x, y) = 2^{image\ bit} \times \left[ \frac{\text{Input}(x, y) - \text{MIN}(\text{Input}(x, y))}{\text{MAX}(\text{Input}(x, y)) - \text{MIN}(\text{Input}(x, y))} \right] \quad (3)$$

Upon receiving a defogging level signal indicating a predetermined defogging level, the scaling unit 360 scales the input image by setting the first minimum brightness value and the first maximum brightness value of the input image, respectively, to the second minimum brightness value and the second maximum brightness value, as a respective scale adjustment width within the reference dynamic range of the input image. Here, the second minimum brightness value may be higher than the minimum brightness value of the reference dynamic range, and the second maximum brightness value may be lower than the maximum brightness value of the reference dynamic range.

As the defogging level decreases, an adjustment width between the first minimum brightness value and the second minimum brightness value and an adjustment width between the first maximum brightness value and the second maximum brightness value decrease, and thus, a scaling degree decreases. In other words, according to an exemplary embodiment, a defogging degree is adaptively reduced as a defogging level decreases, and in the case of a low illuminance image, defogging is not performed.

Equations 4 and 5 below are equations for determining scaling adjustment widths. Here, "level" denotes a defogging level, "Output" denotes an output image of Equation 3, "LevelOutput" denotes an output image scaled to an adjustment width determined according to a defogging level. As a defogging level decreases, the scaling unit 360 gradually reduces an adjustment width until defogging is turned off while gradually decreasing a scaling degree.

$$\text{Adjustment Width} = (\text{Output}(x, y) - \text{Input}(x, y)) \times \frac{\text{level}}{10} \quad (4)$$

$$\text{LevelOutput } t(x, y) = (\text{Input}(x, u) + \text{Adjustment Width}) \quad (5)$$

Figure 3:
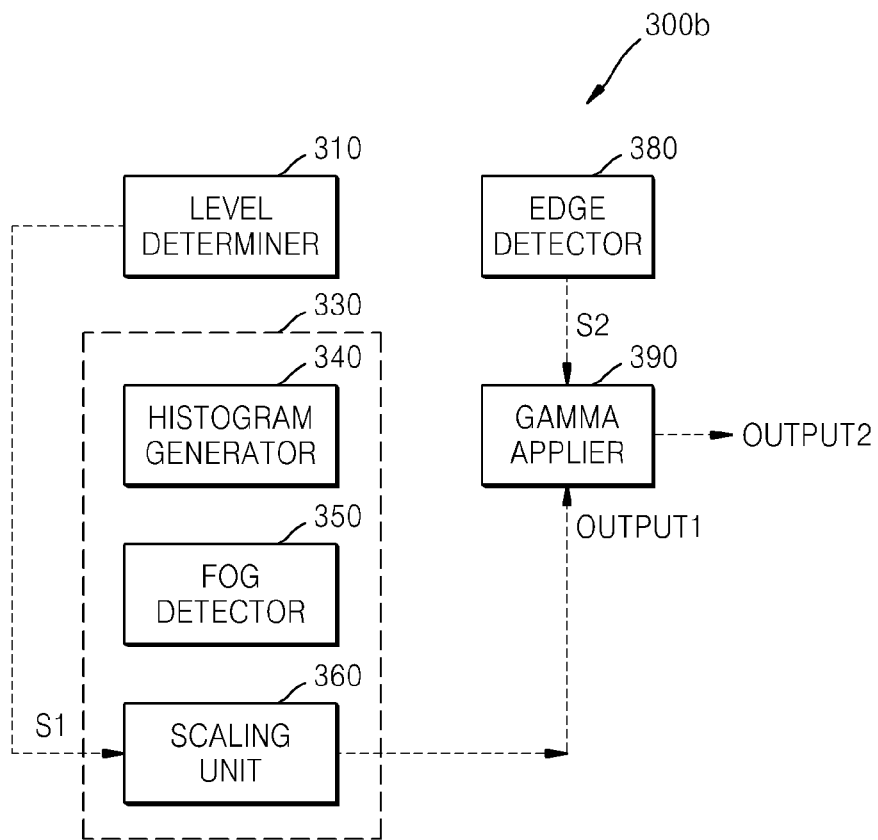
FIG. 3 is a block diagram schematically illustrating a structure of an image processing apparatus, according to another exemplary embodiment.

FIG. 3 is a block diagram schematically illustrating a structure of an image processing apparatus 300b, according to another exemplary embodiment. The image processing apparatus 300b may be the same as the image processing apparatus illustrated in FIG. 1

Referring to FIG. 3, the image processing apparatus 300b according to the embodiment may include the level determiner 310, the defogger 330, an edge detector 380, and a gamma applier 390. Hereinafter, differences between the image processing apparatuses 300a and 300b will be mainly described.

The level determiner 310 may determine a defogging level of an input image according to an amplification value of an illuminance detection signal input from the illuminance sensor 200.

The defogger 330 may include the histogram generator 340, the fog detector 350, and the scaling unit 360. The defogger 330 may determine a fog state of the input image based on a histogram of the input image, and adaptively defog the input image based on the defogging level.

The edge detector 380 may detect an edge amount of the input image. As brightness of the input image increases due to fog, the edge amount decreases. By using such characteristics, the edge detector 380 may detect the edge amount from a graph or lookup table indicating a relationship between the brightness increased by a degree of fog (fog amount), and the edge amount, and may detect when the detected edge amount is lower than or equal to a third threshold value.

Figure 7:
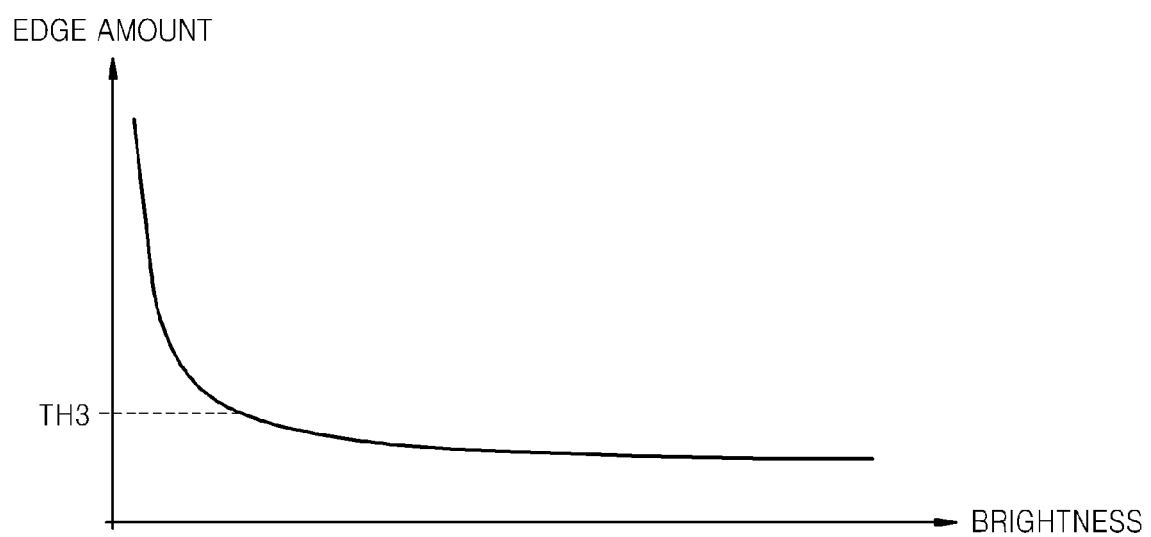
FIG. 7 is a graph showing a relationship between brightness and an edge amount, according to an exemplary embodiment.

FIG. 7 is a graph showing a relationship between brightness and an edge amount, according to an exemplary embodiment. A graph or lookup table of a database of predetermined brightness increased according to a degree of fog, and a respective edge amount may be pre-stored.

Upon detecting whether the edge amount is lower than or equal to a third threshold value TH3, the edge detector 380 outputs a control signal S2.

Upon receiving the control signal S2 from the edge detector 380, the gamma applier 390 may improve contrast by applying a gamma curve to an output image OUTPUT1 that is output by the scaling unit 360. If a fog amount is high, (minimum value/maximum value) of brightness of the input image are low, and thus, contrast is low. Thus, the gamma applier 390 may adaptively determine a gamma curve according to the fog amount and apply the determined gamma curve to the output image OUTPUT1, thereby outputting an output image OUTPUT2 having improved contrast. Equation 6 below is used to obtain contrast of an output image to which a gamma curve is applied.

$$\text{Defog Contrast} = MAX \times \left(\frac{\text{input}}{MAX}\right)^{\left(\frac{1}{\xi}\right)\left(\frac{\text{input}-0.5 \times MAX}{0.5 \times MAX}\right)} \quad (6)$$

Figure 8:
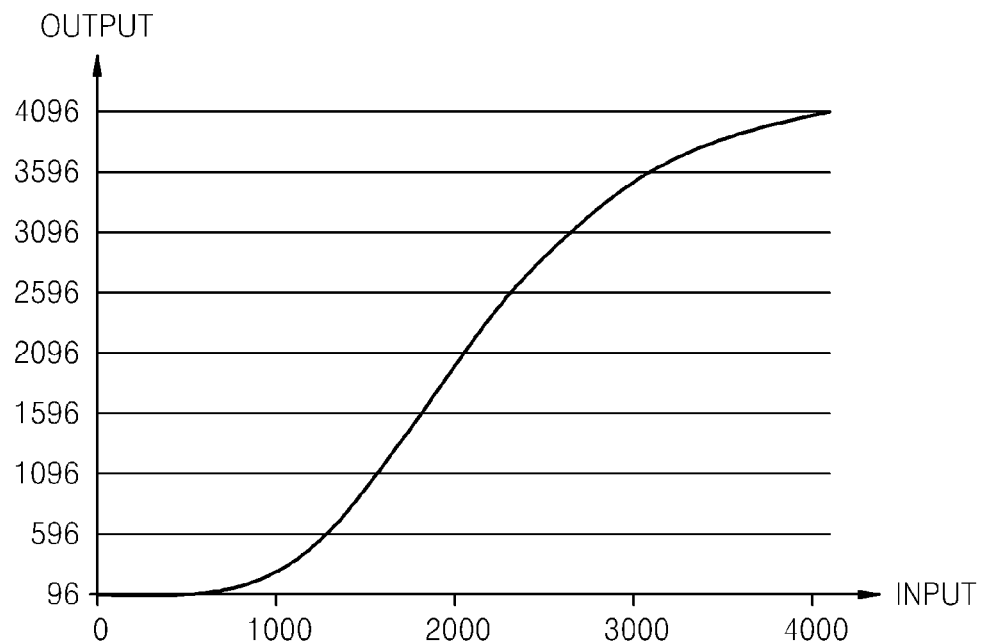
FIG. 8 illustrates an example of a gamma curve, according to an exemplary embodiment.

FIG. 8 illustrates an example of a gamma curve according to an exemplary embodiment. The gamma curve may be adjusted according to a degree of fog. In FIG. 8, an x-axis denotes a brightness value (brightness level) of the output image OUTPUT that is output by the scaling unit 360, and a y-axis denotes a brightness value (brightness level) of an output image obtained by applying a gamma curve.

Figure 9:
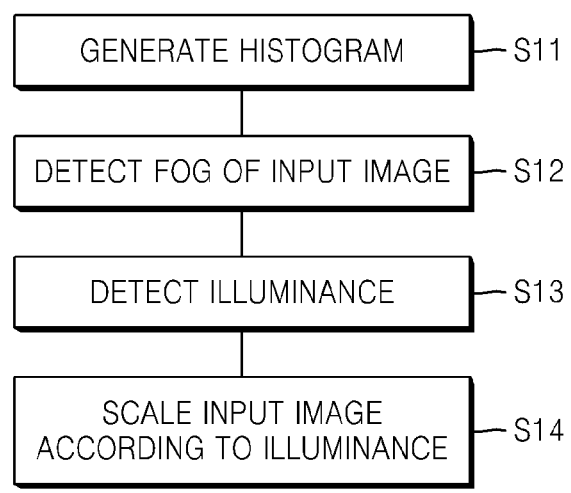
FIG. 9 is a flowchart schematically illustrating a defogging method, according to an exemplary embodiment.

FIG. 9 is a flowchart schematically illustrating a defogging method according to an exemplary embodiment.

Referring to FIG. 9, upon receiving an input image from an image sensor, a defogging system may generate a histogram of an input image in operation S11. The defogging system generates a histogram by using histogram data of a log scale.

In operation S12, the defogging system may detect fog of the input image by analyzing the histogram. When fog has occurred, brightness of the input image increases overall, and thus brightness distribution in the histogram leans towards the right. The fogging system detects a first minimum brightness value and a first maximum brightness value respectively corresponding to a minimum cumulative probability and a maximum cumulative probability pre-set in the histogram. For example, the minimum cumulative probability may be 5% and the maximum cumulative probability may be 95%. The first minimum brightness value and the first maximum brightness value of the input image differ based according to a degree of fog, and (the first minimum brightness value/the first maximum brightness value) decrease as a fog amount increases. Accordingly, the defogging system may detect occurrence of fog and the degree of fog by analyzing the histogram.

In operation S13, the defogging system receives information about a surrounding illuminance from an illuminance sensor. The defogging system periodically receives an amplification value of an illuminance detection signal from the illuminance sensor. The illuminance sensor detects, amplifies, and outputs an ambient brightness. Accordingly, the amplification value increases when the surrounding environment is darker. In other words, the illumination detection signal output by the illuminance sensor is inversely proportional to an illuminance level. The amplification value increases as the illuminance level decreases, and the amplification value decreases as the illuminance level increases.

In operation S14, the defogging system may output, by scaling the input image according to the surrounding illuminance, an image from which fog is removed.

The defogging system sets a defogging level to the maximum if the amplification value of the illuminance detection signal received from the illuminance sensor is smaller than a first threshold value. The defogging system uniformizes brightness of the input image by full-scaling a current brightness range of the input image to a reference dynamic range according to the maximum defogging level. In other words, the defogging system scales the input image by re-setting the first minimum brightness value and the first maximum brightness value to a minimum brightness value and a maximum brightness value of the reference dynamic range. The defogging system may uniformize the brightness of the input image, thereby outputting an image having a defogging effect by increasing a contrast thereof.

The defogging system sets the defogging level to the minimum if the amplification value is higher than a second threshold value. The defogging system outputs the input image without scaling according to the minimum defogging level.

The defogging system sets a respective defogging level if the amplification value is between the first and second threshold values. The defogging system calculates an adjustment width corresponding to the defogging level, scales the input image by the adjustment width within the reference dynamic range, and outputs the scaled input image. In other words, the defogging system scales the input image by setting a second minimum brightness value higher than the minimum brightness value of the reference dynamic range, and a second maximum brightness value smaller than the maximum brightness value of the reference dynamic range.

As the amplification value changes from the first threshold value to the second threshold value, the defogging system gradually decreases the defogging level, and accordingly gradually decreases the adjustment width, thereby gradually decreasing a scaling degree of the input image, i.e., a defogging degree.

Figure 10:
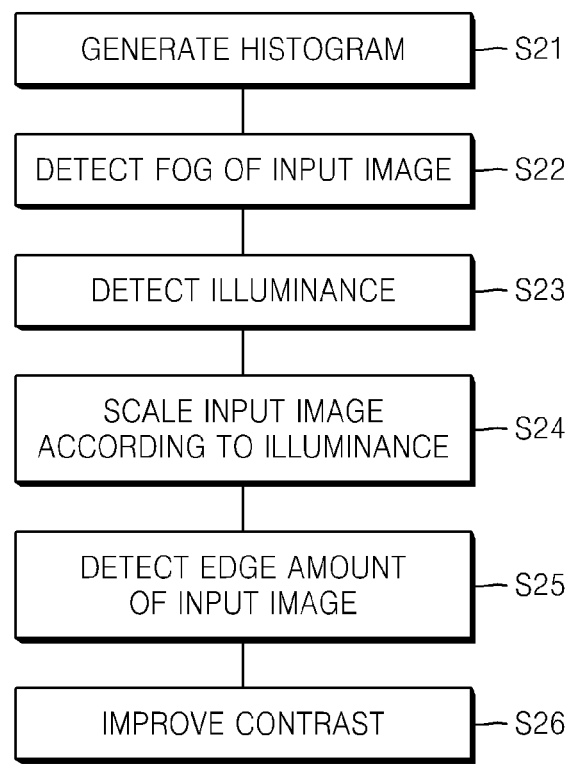
FIG. 10 is a flowchart schematically illustrating a defogging method, according to another exemplary embodiment.

FIG. 10 is a flowchart schematically illustrating a defogging method according to another exemplary embodiment.

The defogging method of FIG. 10 is different from that of FIG. 9 in that some operations are added to the defogging method of FIG. 10. These differences will now be mainly described.

When an input image is received from an image sensor, a defogging system may generate a histogram of the input image in operation S21. The defogging system may detect fog of the input image by analyzing the histogram. The defogging system receives information about a surrounding illuminance from an illuminance sensor in operation S23. In operation S24, the defogging system may output a defogged image by scaling the input image according to the surrounding illuminance.

The defogging system may detect an edge amount of the input image in operation S25.

In operation S26, if the edge amount of the input image is lower than or equal to a third threshold value, the defogging system may apply a gamma curve to the defogged image so as to improve contrast.

A defogging method according to the above embodiments may automatically and adaptively adjust a level of applying a defogging function by using a histogram of a log scale and a statistical method. Also, a defogging method according to the above embodiments may prevent deterioration of an image quality by automatically slightly applying or not applying a defogging function under a low illuminance environment and a no-fog condition.

A defogging method according to the above embodiments may be used in relation to surveillance cameras, such as analog cameras and network cameras.

As described above, according to the above embodiments, a defogging method automatically and adaptively applies a defogging algorithm based on a current fog state and illuminance, thereby reducing deterioration of an image quality.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

At least one of the components, elements or units represented by a block as illustrated in FIGS. 2 and 3 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A defogging system comprising at least one processor configured to implement:
    an illuminance sensor detecting a surrounding illuminance;
    a level determiner determining a defogging level of an input image based on the detected surrounding illuminance; and
    a defogger determining a fog state of the input image based on a histogram of the input image, and adaptively defog the input image according to the determined fog state and defogging level,
    wherein the defogger comprises:
        a histogram generator configured to generate the histogram of the input image;
        a fog detector configured to detect a first minimum brightness value and a first maximum brightness value from the histogram, the first minimum brightness value and the first maximum brightness value corresponding to a pre-set cumulative probability; and
        a scaling unit configured to scale the input image by respectively resetting the first minimum brightness value and the first maximum brightness value to a second minimum brightness value and a second maximum brightness value according to the defogging level determined based on the detected surrounding illuminance.

2. The defogging system of claim 1, wherein the level determiner outputs a maximum defogging level signal if an amplification value of an illuminance detection signal of the illuminance sensor is smaller than a first threshold value, outputs a minimum defogging level signal if the amplification value is higher than a second threshold value, and outputs a corresponding defogging level signal if the amplification value is between the first and second threshold values.

3. The defogging system of claim 2, wherein the level determiner changes the defogging level as the amplification value changes between the first threshold value and the second threshold value.

4. The defogging system of claim 2, wherein the level determiner decreases the defogging level as the amplification value changes from the first threshold value to the second threshold value.

5. The defogging system of claim 1, wherein the second minimum brightness value is set to be smaller than the first minimum brightness value, and the second maximum brightness value is set to be greater than the first maximum brightness value.

6. The defogging system of claim 1, wherein the fog detector determines a brightness value at which the pre-set cumulative probability of the histogram is a first reference value as the first minimum brightness value, and determines a brightness value at which the pre-set cumulative probability is a second reference value as the first maximum brightness value.

7. The defogging system of claim 6, wherein the first reference value is 5% of the pre-set cumulative probability and the second reference value is 95% of the pre-set cumulative probability.

8. The defogging system of claim 1, wherein, as the defogging level decreases, the scaling unit reduces an adjustment width between the first minimum brightness value and the second minimum brightness value and an adjustment width between the first maximum brightness value and the second maximum brightness value.

9. The defogging system of claim 1, wherein the processor is further configured to implement:
    an edge detector detecting an edge amount of the input image; and
    a gamma applier, if the edge amount of the input image is lower than or equal to a third threshold value, improving a contrast of the input image by applying a gamma curve to the input image that is defogged based on a relationship between a pre-set brightness and an edge amount.

10. A defogging method using at least one processor, the method comprising:
    detecting a surrounding illuminance by an illuminance sensor;
    determining a defogging level of an input image based on the detected surrounding illuminance; and
    determining a fog state of the input image based on a histogram of the input image, and adaptively defogging the input image according to the determined fog state and defogging level,
    wherein the determining the fog state and the adaptively defogging comprises:
        generating the histogram of the input image;
        detecting a first minimum brightness value and a first maximum brightness value which correspond to a pre-set cumulative probability from the histogram; and
        scaling the input image by respectively resetting the first minimum brightness value and the first maximum brightness value to a second minimum brightness value and a second maximum brightness value according to the defogging level determined based on the detected surrounding illuminance.

11. The defogging method of claim 10, wherein the determining the defogging level comprises:

outputting a maximum defogging level signal if an amplification value of an illuminance detection signal of the illuminance sensor is smaller than a first threshold value;

outputting a minimum defogging level signal if the amplification value is higher than a second threshold value; and outputting a corresponding defogging level signal if the amplification value is between the first and second threshold values.

12. The defogging method of claim 11, wherein the defogging level is changed as the amplification value changes between the first threshold value and the second threshold value.

13. The defogging method of claim 11, wherein the defogging level is decreased as the amplification value changes from the first threshold value to the second threshold value.

14. The defogging method of claim 10, wherein the second minimum brightness value is set to be smaller than the first minimum brightness value, and the second maximum brightness value is set to be greater than the first maximum brightness value.

15. The defogging method of claim 10, wherein the detecting the first minimum brightness value and the first maximum brightness value comprises determining a brightness value at which the pre-set cumulative probability of the histogram is a first reference value as the first minimum brightness value, and determining a brightness value at which the pre-set cumulative probability is a second reference value as the first maximum brightness value.

16. The defogging method of claim 15, wherein the first reference value is 5% of the pre-set cumulative probability and the second reference value is 95% of the pre-set cumulative probability.

17. The defogging method of claim 10, wherein the scaling the input image comprises, as the defogging level decreases, reducing an adjustment width between the first minimum brightness value and the second minimum brightness value and an adjustment width between the first maximum brightness value and the second maximum brightness value.

18. The defogging method of claim 10, further comprising:
detecting an edge amount of the input image; and
improving a contrast of the input image by applying a gamma curve to the input image that is defogged, if the edge amount of the input image is lower than or equal to a third threshold value, based on a relationship between a pre-set brightness and an edge amount.

* * * * *